United States Patent [19]

Takemura

[11] Patent Number: 5,099,317

[45] Date of Patent: Mar. 24, 1992

[54] VIDEO CAMERA APPARATUS USING A PLURALITY OF IMAGING DEVICES

[75] Inventor: Yasuo Takemura, Tokyo, Japan

[73] Assignee: Kabushiki Kaisha Toshiba, Kawasaki, Japan

[21] Appl. No.: 411,833

[22] Filed: Sep. 25, 1989

[30] Foreign Application Priority Data

Sep. 28, 1988 [JP] Japan .................. 63-242910

[51] Int. Cl.$^5$ .............................................. H04N 9/07
[52] U.S. Cl. ........................................ 358/44; 358/41
[58] Field of Search ............... 358/41, 43, 44, 49, 358/53, 55, 68

[56] References Cited

U.S. PATENT DOCUMENTS

| 4,016,598 | 4/1977 | Yamanaka | 358/41 |
| 4,071,853 | 1/1978 | Yamanaka | 358/41 |
| 4,238,765 | 12/1980 | Nagumo | 358/43 |
| 4,322,740 | 3/1982 | Takemoto et al. | 358/44 |
| 4,530,004 | 7/1985 | Achiha et al. | |
| 4,570,178 | 2/1986 | Morimura et al. | 358/41 |
| 4,791,479 | 12/1988 | Ogiu et al. | 358/44 |
| 4,899,213 | 6/1990 | Konishi et al. | 358/41 |

FOREIGN PATENT DOCUMENTS 60-81996 5/1985 Japan .

OTHER PUBLICATIONS

CCD Camera Technology; Takemura 1986.

Primary Examiner—James J. Groody
Assistant Examiner—Kim Yen Vu
Attorney, Agent, or Firm—Cushman, Darby & Cushman

[57] ABSTRACT

In a video camera apparatus, one of two optical paths obtained by a split optical system is led to a first solid state image pickup device and the other optical path is led to a second solid state image pickup device. The first and second solid state image pickup devices each have a plurality of optoelectric transducing elements as pixels arrayed vertically and horizontally in a plane on which an image is formed by the light passed through an objective. In the second device, an interval between the two adjacent optoelectric transducing elements is equal to that between the two adjacent optoelectric transducing elements arrayed in the image forming plane of the first device. The optoelectric transducing elements arrayed in the image forming plane of the second device is vertically and horizontally displaced by ½ of the pixel pitch from the corresponding optoelectric transducing elements arrayed in the image forming plane of the first device. The first and second devices successively pick up charges generated in the optoelectric transducing elements and output them in the form of image signals.

6 Claims, 12 Drawing Sheets

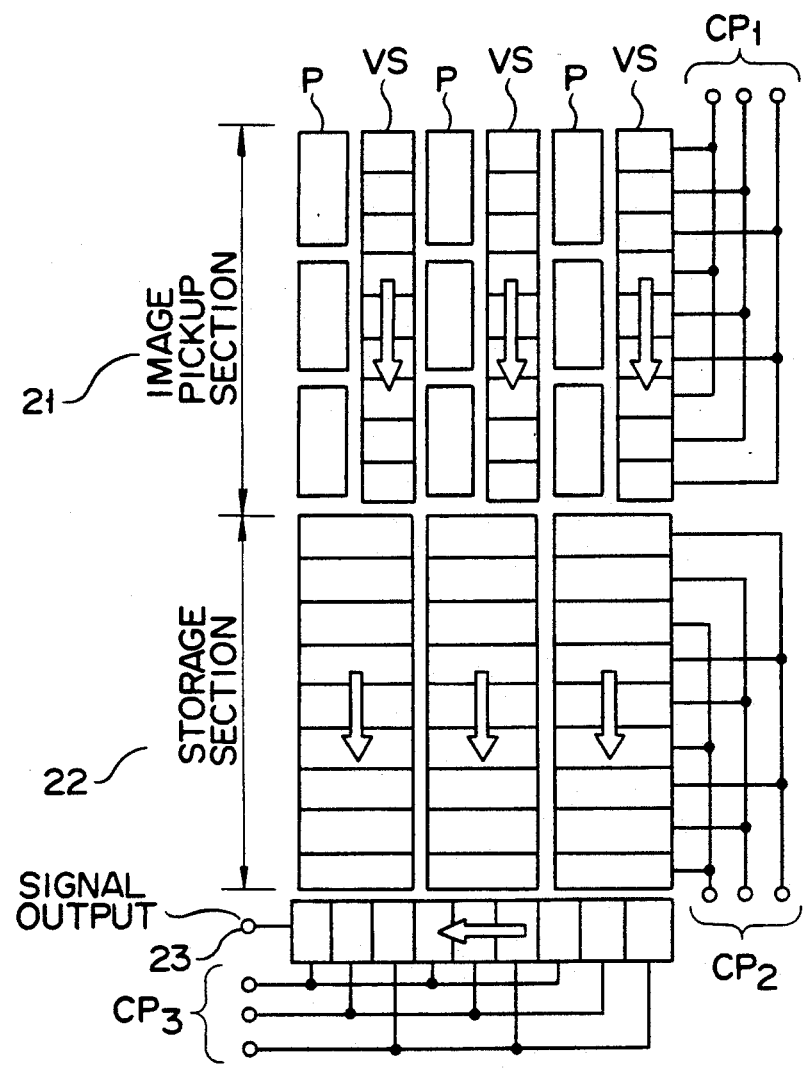
F I G. 2

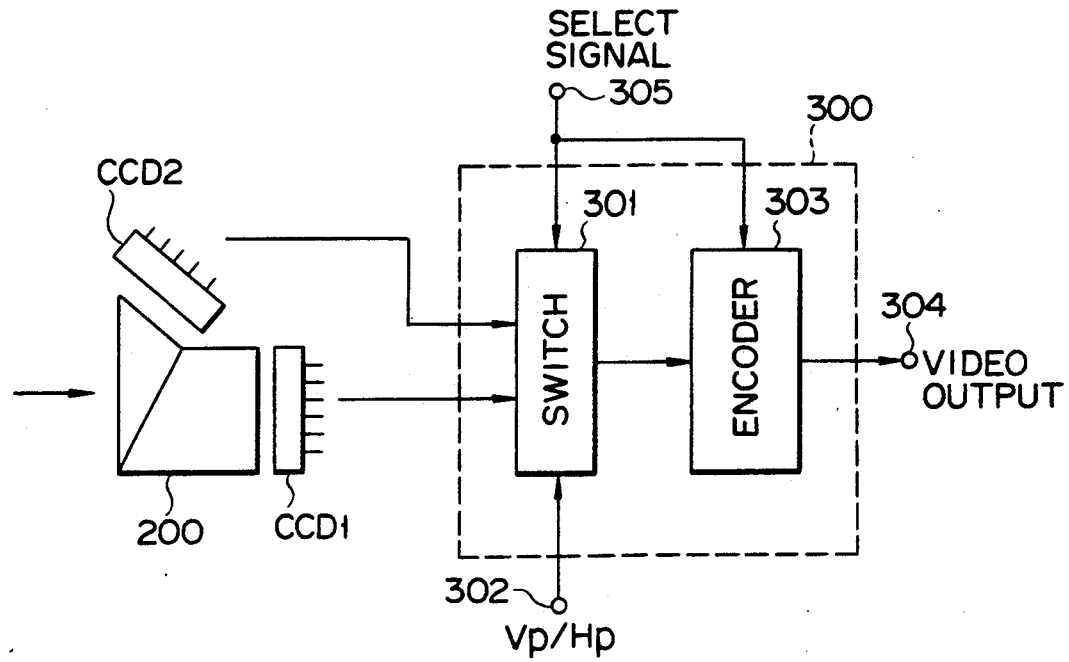
F I G. 4A
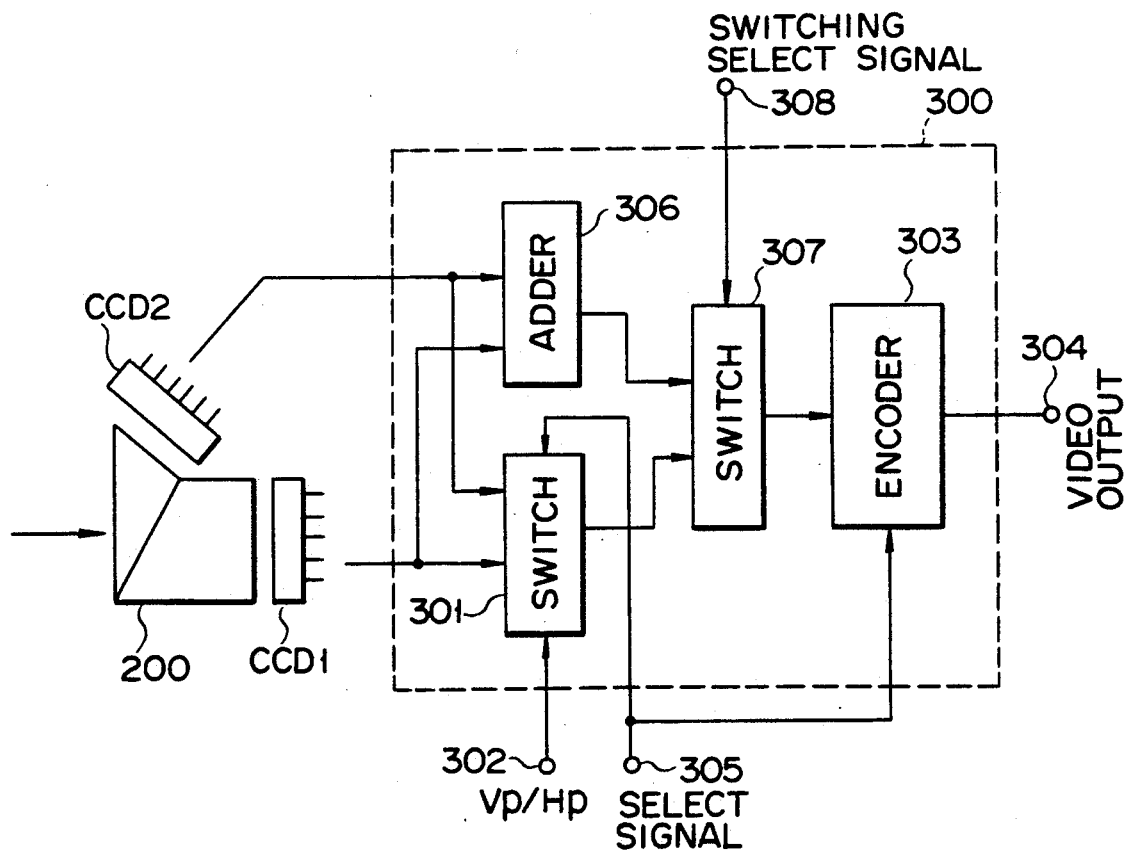
F I G. 4B

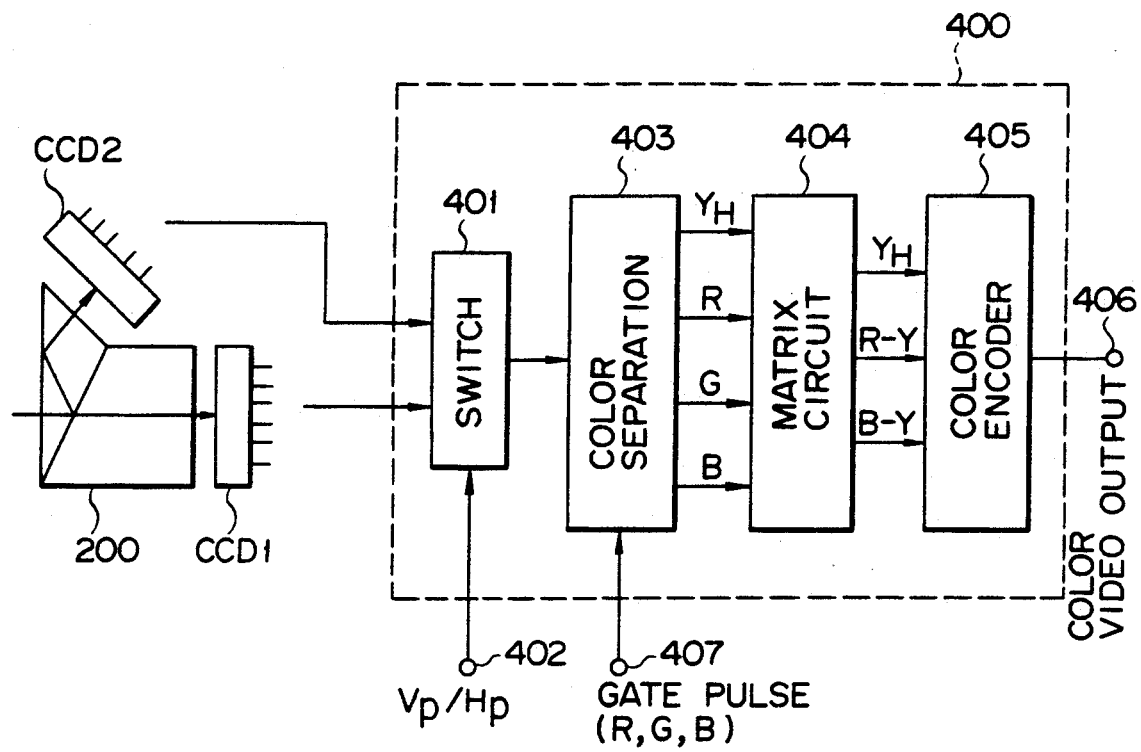
F I G. 6
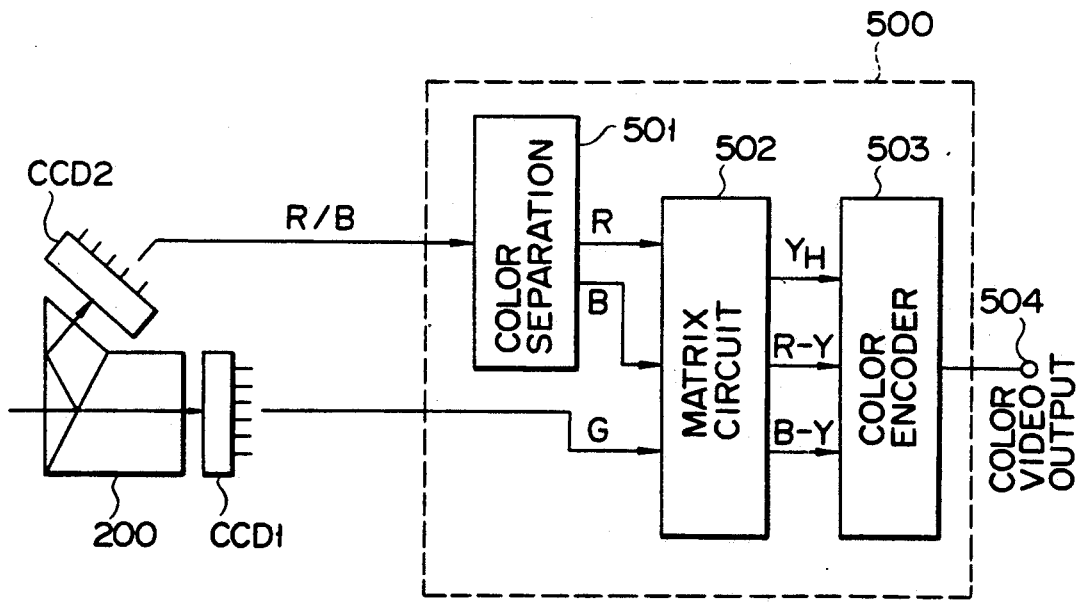
F I G. 12

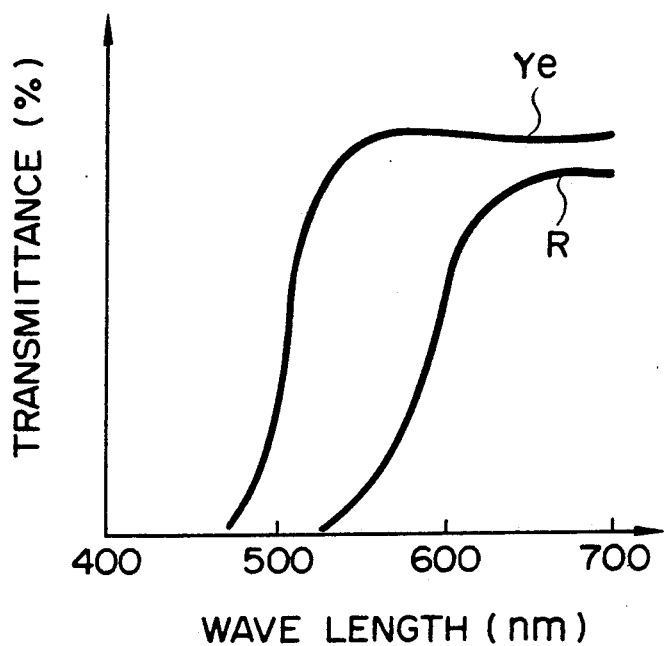
F I G. 11A
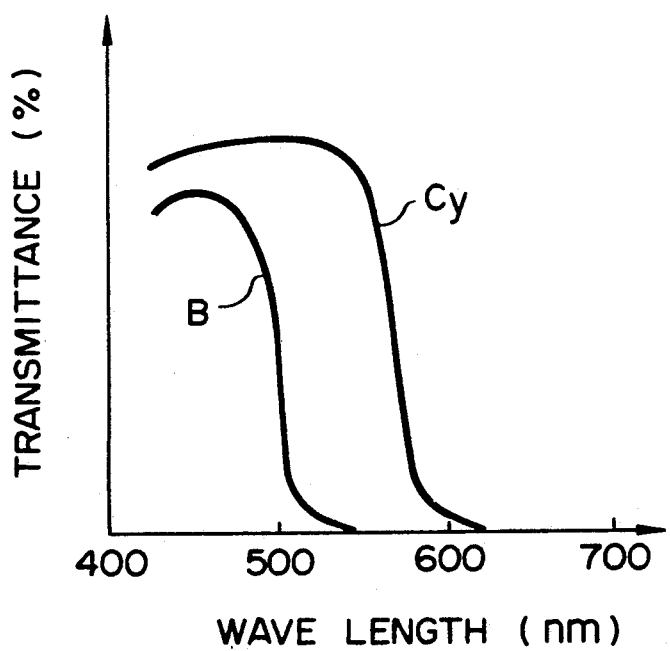
F I G. 11B

VIDEO CAMERA APPARATUS USING A PLURALITY OF IMAGING DEVICES

BACKGROUND OF THE INVENTION

1. Field of the Invention

The present invention relates to a video camera apparatus using a solid state image pickup device.

2. Description of the Related Art

By convention, a video camera apparatus has employed a solid state image pickup device as the combination of a CCD (charge coupled device) and optoelectric transducer elements. Remarkable progress of recent IC technology has increased the number of the picture elements (pixels) per unit area of the image pickup device. The increased number of pixels has greatly improved the picture quality of the image obtained by the video camera apparatus.

The increased number of the pixels, however, is attendant with many problems. Firstly, it needs a microfabrication technique. Because of this, the equipment to manufacture is increased and a production yield is degraded. Even if the image pickup device thus improved is used, in the case of the HDTV (high definition TV) system, the frequency band of the luminance signal is broader, i.e., 20 MHz or more. A great drive power for the horizontal transfer in the CCD is required. This results in increase of the size and weight of a power source section, e.g., a battery, and hinders a consistant tendency to the size reduction of the camera apparatus. Further, the larger the number of pixels per unit area is, the smaller the size of each pixel becomes. The quantities of charges for each pixel also become smaller. This leads to reduction of the sensitivity and S/N ratio. Additionally, if the image forming surface has a fine scratch, it appears in the reproduced image in the form of a relatively large drop of image. This fact contributes to degradation of the production yield.

One of the possible approaches to improve the sensitivity and the S/N ratio is to increase the device area with increase of the number of pixels per unit area. This approach, however, encounters a difficulty in manufacturing semiconductor devices of large area at a good production yield.

For the above reasons, under a condition that the device area remains unchanged, it is impossible to increase the number of pixels in the solid state image device. Further, there is a limit in increasing the device area. Additionally, the increase of the device area constitutes an unfavorable factor in reducing the camera size.

SUMMARY OF THE INVENTION

Accordingly, an object of the present invention is to provide a video camera apparatus with a system to double the number of pixels at least in the vertical direction.

Another object of the present invention is to provide a video camera apparatus capable of readily obtaining various types of video signals including those of the interlace type or the noninterlace type.

A still another object of the present invention is to provide a video camera apparatus making it easy to manufacture solid state image pickup devices.

To achieve the above objects, there is provided a video camera apparatus comprising: a split optical system receiving light through an objective and leading the light into two optical paths in different directions; first solid state image pickup device receiving the light traveling through one of the optical paths led from the split optical system, and having a plurality of optoelectric transducing elements as pixels arrayed vertically and horizontally in a plane on which an image is formed by the light passed through the objective, the first solid state image pickup device successively picking up charges generated in the optoelectric transducing elements and outputting them in the form of image signals; second solid state image pickup device receiving the light traveling through the other of the optical paths led from the split optical system, and having a plurality of optoelectric transducing elements as pixels arrayed vertically and horizontally in a plane on which an image is formed by the light passed through the objective, an interval between the two adjacent optoelectric transducing elements being equal to that between the two adjacent optoelectric transducing element arrayed in the image forming plane of the first solid state image pickup device, the optoelectric transducing elements arrayed in the image forming plane of the second image pickup device being at least vertically displaced by ½ of the pixel pitch from the corresponding optoelectric transducing elements arrayed in the image forming plane of the first image pickup device, respectively, the second solid state image pickup device successively picking up charges generated in the optoelectric transducing elements, and outputting them in the form of image signals; and signal converting/processing means for converting the image signals derived from the first and second solid state image pickup devices into video signals.

Other objects, features and advantage of the present invention will be apparent when carefully reading the description of the specification in connection the accompanying drawings, in which:

BRIEF DESCRIPTION OF THE DRAWINGS

FIG. 2 shows a schematic illustration of an example of a solid state image pickup device which is used in the video camera apparatus of FIG. 1;

FIGS. 4A and 4B each show the details of a signal converting/processing unit of the video camera apparatus of FIG. 1, the signal converting/processing unit of FIG. 4B additionally containing an automatic sensitivity select circuit;

FIG. 6 is a block diagram showing a signal converting/processing unit of the color image pickup device of FIG. 5;

FIGS. 11A and 11B show graphs for explaining the characteristics of complementary color filters available for the color filters in the color filter array;

FIG. 12 is a block diagram showing a signal converting/processing unit of the color image pickup device using the color filter array shown in FIG. 10;

DETAILED DESCRIPTION OF THE PREFERRED EMBODIMENTS

Some specific embodiments of a video camera apparatus according to the present invention will be described with reference to the accompanying drawings.

Figure 1:
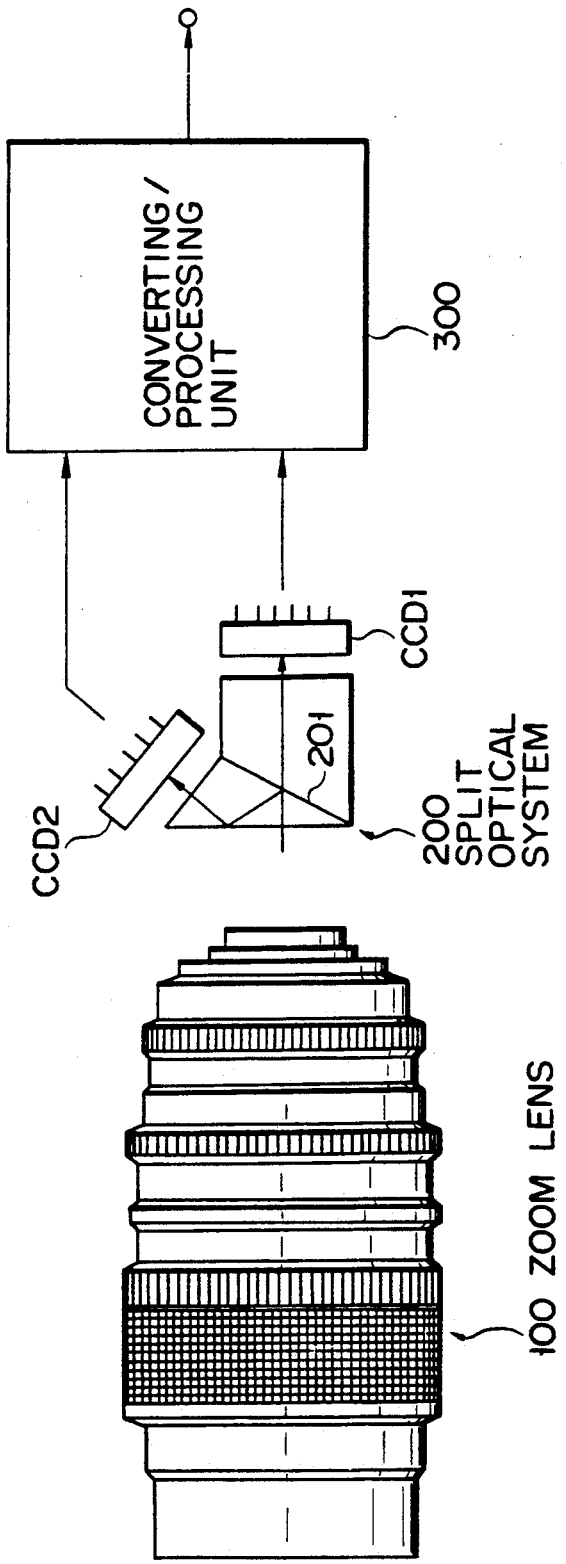
FIG. 1 illustrates a scheme of a video camera apparatus into which the present invention is applied.

Referring to FIG. 1, there is schematically illustrated a video camera apparatus according to the present invention. Light passed through an objective 100 is led to a split optical system 200. The system 200, containing a half-prism, splits the light incident on the front surface of the prism into two light beams. One of the light beams is led to the image forming surface of a first solid state image pickup device CCD1, while the other is led to a second solid state image pickup device CCD2. The image signals derived from the devices CCD1 and CCD2 are led to a signal converting/processing unit 300 where these signals are converted into video signals.

In this instance, the image pickup devices CCD1 and CCD2 are of the frame interline type as shown in FIG. 2. The image pickup device as the combination of the devices CCD1 and CCD2 includes an image pickup section 21 and a storage section 22.

In the image pickup section 21, pixels P as optoelectric transducing elements are two dimensionally arranged to form a pixel array in an image forming plane. A vertical transfer section VS is vertically laid in each gap between the adjacent pixel columns of the pixel array. The vertical transfer section VS contains a charge coupled transfer device. Signal charges gathered in the pixels P are simultaneously transferred to the vertical transfer section VS in a field shift control manner. The charges are vertically transferred for each line by a first drive pulse CP1. The transferred charges are transferred to the storage section 22 at a high speed, and temporarily stored therein. CCDs substantially make up the storage section 22. The charges set in the storage section 22 are transferred to a horizontal transfer section HS for each line by a second drive pulse CP2. The charges stored in the horizontal transfer section HS are led to an output terminal 23 in horizontal line periods by a third drive pulse CP3. The signal charges are transmitted from the output terminal 23 in the form of a video signal.

The solid state image pickup device with the storage section 22 is capable of quickly sweeping out unnecessary charges and storing only the necessary charges in the storage section 22. Accordingly, it is possible to store necessary signal charges and to read the signal charges at a necessary speed in a manner that after unnecessary charges are swept out of the pixels P, the necessary signal charges are stored after an exposure time as is exactly preset.

Figure 3A:
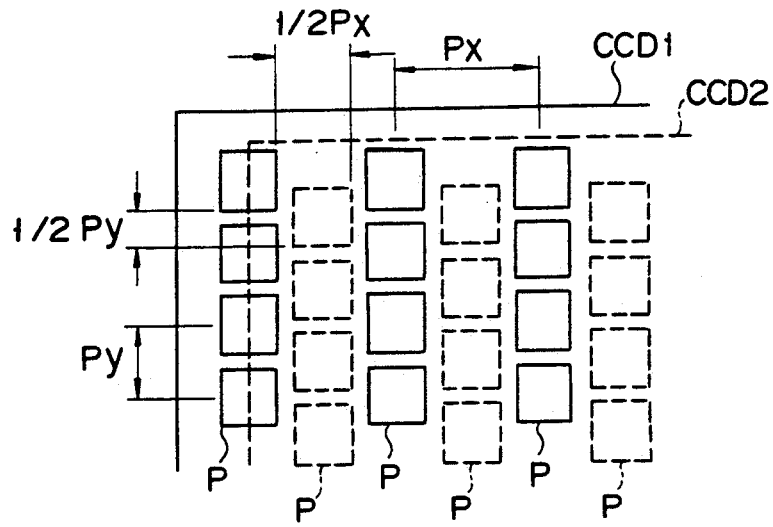
FIGS. 3A through 3C show plan views of an image pickup section of the image pickup device of FIG. 2, the illustration showing a relationship between first and second pixel arrays making up the image pickup device.
Figure 3B:
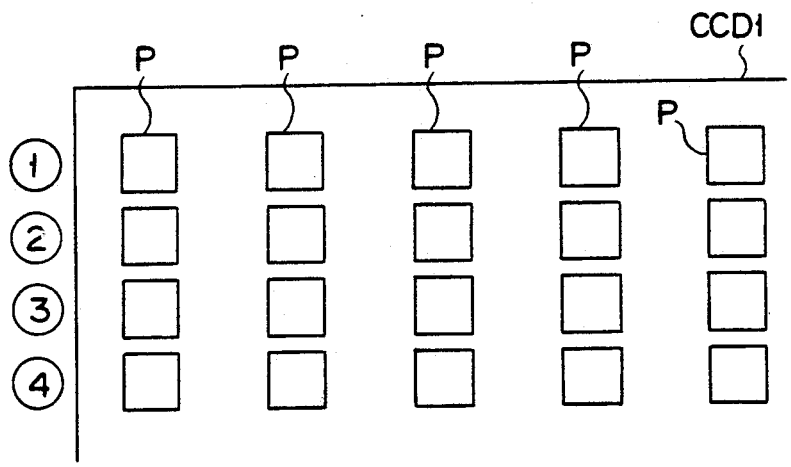
Figure 3C:
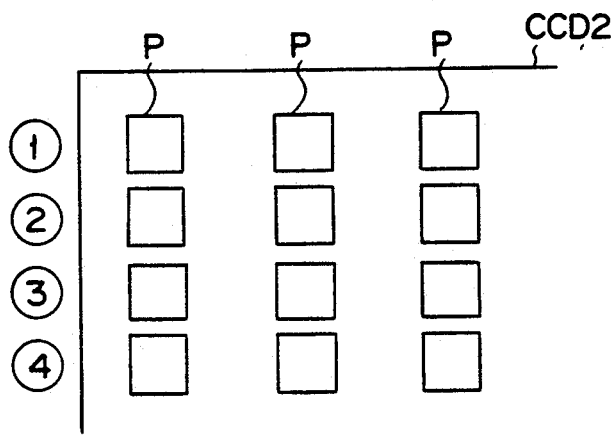

A relationship between the first and second solid state image pickup devices CCD1 and CCD2 will be described with reference to FIGS. 3A through 3C. FIG. 3A shows an array of pixels P as optoelectric transducing elements when the first and second solid state image pickup devices CCD1 and CCD2 are combined. The pixel array is formed in the image forming plane, as already mentioned. FIG. 3B shows a pixel array of the first image pickup device CCD1. FIG. 3C shows a pixel array of the second image pickup device CCD2. These pixel arrays of the devices CCD1 and CCD2 form the pixel array shown in FIG. 3A.

More specifically, the first image pickup device CCD1 receives one of the light beams emanating from the split optical system 200. Pixels P as optoelectric transducing elements are vertically and horizontally arranged into a matrix array of pixels in an image forming plane in which an image is formed by the light passed the objective 100 and the optical system 200. The charges generated in the pixels P upon receipt of the light are successively picked up and are output as signal charges. In FIG. 3A, square boxes as indicated by solid lines are the pixels P of the first device CCD1.

The second image pickup device CCD2 receives the other of the light beams emanating from the split optical system 200. Pixels P as optoelectric transducing elements are vertically and horizontally arranged into a matrix array of pixels in an image forming plane in which an image is formed by the light passed the objective 100 and the optical system 200. In the pixel array of the second image pickup device CCD2, a pitch or an interval between the adjacent pixels is equal to that in the first image pickup device CCD1, but in the pixel arrays, each pixel of the second image pickup device CCD2 is vertically and horizontally displaced from the corresponding one of the first image pickup device CCD1 by $\frac{1}{2}$ pitch, viz., $\frac{1}{2}$Px (Px: pitch as horizontally viewed) and $\frac{1}{2}$Py (Py: pitch as vertically viewed). The charges generated in the pixels P upon receipt of the light are successively picked up and are output as signal charges. In FIG. 3A, square boxes as indicated by dash lines are the pixels P of the second device CCD2.

The image pickup device that is the combination of the first and second image pickup devices CCD1 and CCD2 as mentioned above, can double the vertical and horizontal resolutions of a reproduced image. If the first image pickup device CCD1 produces 500 scanning lines for the first field and the second image pickup device CCD2 produces 500 scanning lines for the second field, a total of 1000 scanning lines can be obtained for the first and second fields. This indicates that the vertical resolution of the image is doubled. The pixels in the pixel array of the first image pickup device CCD1 are horizontally displaced from those in the pixel array of the second image pickup device CCD2 by ½ pitch (½Px). Accordingly, the number of pixels arrayed in the rows of the pixel array is doubled for each frame. This indicates that the horizontal resolution is also double.

Turning now to FIG. 4A, there is shown in block form the detail of the signal converting/processing unit 300. The unit 300 is made up of a switch portion 301 and an encoder portion 303. A vertical pulse signal Vp is applied to the switch portion 301 through a control terminal 302. The pulse signal Vp is used to switch the switch portion 301 every field. Specifically, the switch portion 301 responds to the vertical pulse signal Vp to alternately select the output signals of the first and second image pickup devices CCD1 and CCD2 every field, and outputs the selected signal to the succeeding stage, i.e., the encoder portion 303. The encoder 303, upon receipt of the signal, applies to the signal necessary signal processings, such as gain control, clamping, and addition of a sync signal, and produces the thus processed signal as a video signal from an output terminal 304.

The encoder portion 303 may be a known encoder used in a usual video camera apparatus, for example, the encoder described in Television Engineering Handbook, issued by McGraw-Hill Co., 1957, Chapters 9, 9-45.

Alternatively, a horizontal pulse signal Hp, in place of the vertical pulse signal Vp, may be used. In this case, the switch portion 301 alternately selects the output signals of the first and second image pickup devices CCD1 and CCD2 every scanning line, and successively outputs the selected signal to the succeeding stage, in the form of a line-succession signal used in the noninterlace system. This signal is useful in demodulating a definition television signal in the monitor side. Particularly, it can be applied directly to the scanning line converter in a high definition TV set.

The present invention allows the switch portion 301 to operate in the following way. A select signal is applied to a terminal 305 of the switch portion 301. In response to the select signal, the switch portion 301 selects the output signal of either of the first and second image pickup devices CCD1 and CCD2 and continuously outputs the selected signals to the succeeding stage. According to this mode of the present invention, if one of the solid state image pickup devices CCD1 and CCD2 fails, the image pickup can be secured by the other normal device. Further, the use of the select signal makes the video camera apparatus to be compatible with a video tape recorder of the NTSC type.

The signal converting/processing unit 300 may be arranged to have an additional function, as shown in FIG. 4B. In the figure, like portions are designated by like reference numbers in FIG. 4A, for simplicity. As shown the output signals of the first and second devices CCD1 and CCD2 are applied to a first switch portion 301, thereby to obtain an interlace signal, noninterlace signal and a select signal. The same output signals are applied to an adder 306. The output signals of the adder 306 and the switch portion 301 are applied to a second switch portion 307. In response to a select signal from a select terminal 308, the second switch portion 307 selects one of the output signals of the adder 306 and the first switch portion 301, and outputs the selected signal to an encoder portion 303.

The signal converting/processing unit 300 thus arranged provides an automatic high sensitivity image pickup function in any of the modes, the interlace, noninterlace and select. The addition of the output signals of the devices CCD1 and CCD2 is equivalent to the fact that the camera receives the composition of the light beams split by the half prism of the split optical system 200, and therefore the signal amplitude is doubled. To form a select signal applied to the terminal 308, check is made if an amount of light passing through the objective 100 is above or below a tolerable lower limit value of the solid state image pickup devices. In this instance, if the light amount is equal to or greater than the lower limit value, the select signal applied through the terminal 308 to the second switch portion 307 causes the switch portion 307 to select the output signal of the first switch portion 301. If it is less than the lower limit value, the second switch portion 307 selects the output signal of the adder 306. Accordingly, where an amount of incident light is decreased to such an extent that the effective image signals cannot be obtained, the output signal of the adder 306 is automatically selected to have a doubled signal level. Accordingly, even in a relatively dim place, the signal converting/processing unit 300 thus arranged ensures a reliable image pickup operation by the video camera apparatus guarantees, although the picture quality of a resultant image is poor. In this case, the output signals of the image pickup devices CCD1 and CCD2 must reach the adder at the same time. To achieve this, the drive timings of those output signals are made coincident with each other or one of the output signals of the devices CCD1 and CCD2 is delayed with respect to the other, thereby to make both the signals coincident with each other in time.

Alternatively, the output signals of the image pickup devices CCD1 and CCD2 are processed in parallel and subjected to a color signal separation process. Then, the separated color signals are added.

Figure 5A:
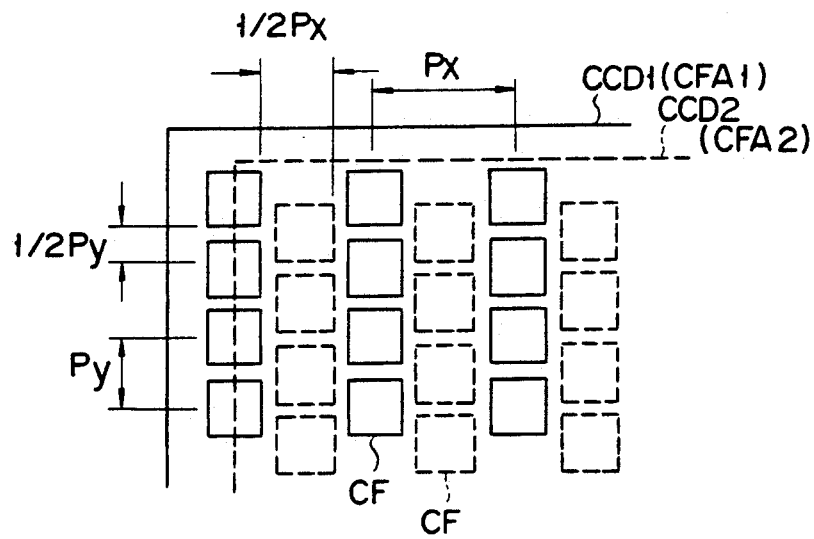
FIGS. 5A through 5C show plan views of an image pickup section of the image pickup device of FIG. 2 when the device is for picking up a color image, the illustration showing a relationship between a color filter array applied to the first and second pixel arrays, which make up the image pickup device, and showing a relationship between the first and second pixel arrays.
Figure 5B:
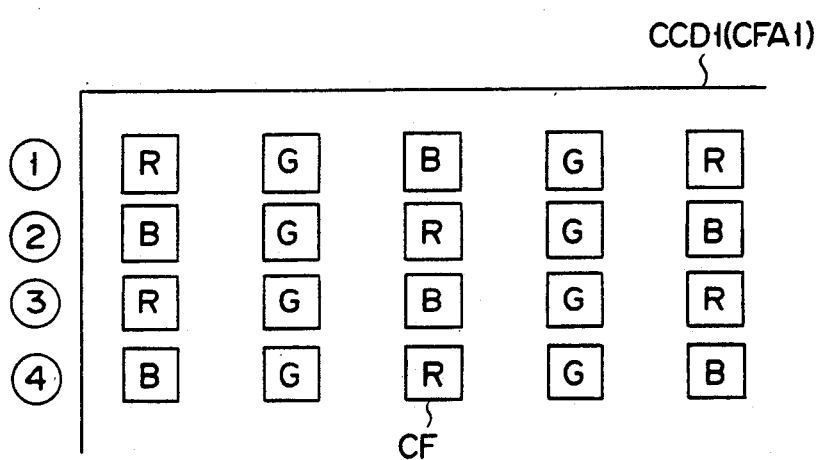
Figure 5C:
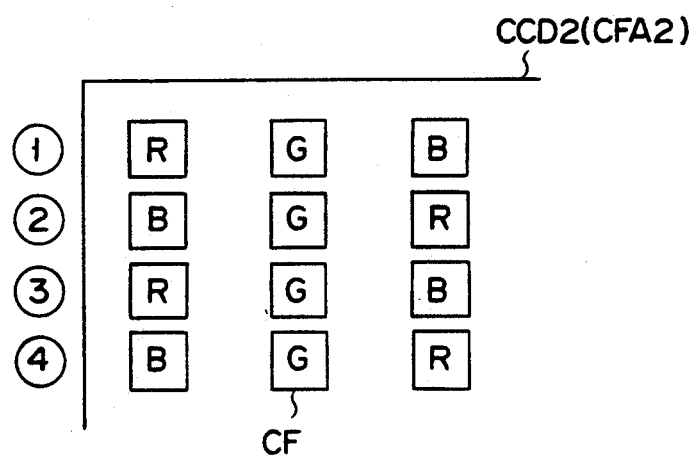

FIGS. 5A through 5C show plan views of an image pickup section of the image pickup device of FIG. 2 when the device is for picking up a color image. FIG. 5A shows an array of color filters CF applied to the pixels P when the first and second solid state image pickup devices CCD1 and CCD2 are combined. The pixel array is formed in the image forming plane, as already mentioned. FIG. 5B shows a color filter array CFA1 of the first image pickup device CCD1. FIG. 5C shows a color filter array CFA2 of the second image pickup device CCD2. These color filter arrays CFA1 and CFA2 of the devices CCD1 and CCD2 form the color filter array shown in FIG. 5A. The arrays CFA1 and CFA2 each have a checkered pattern consisting of red (R), green (G) and blue (B) filters CF. In each array, vertical linear arrays consisting of R and B filters and vertical linear array consisting of only G filters are alternately arranged. Accordingly, color filters CF linearly arrayed in the order of R and B are vertically repeated. The color filters CF linearly arrayed in the order of R, G, B, and G are horizontally repeated. These color filters CF are applied respectively to the pixels P arrayed as shown in FIGS. 3A to 3C. Accordingly, the rules of the vertical displacements of ½Py and the horizontal displacement of ½Px correspondingly exist in those color filter arrays of the first and second image pickup devices CCD1 and CCD2.

Also in the present embodiment, the signal charges may be read out of the solid state image pickup devices. To obtain a video signal of the interlace type, the output signal of the first image pickup device CCD1, for example, is used for the first (odd numbered) fields, while output signal of the second image pickup device CCD2 is used for the first (even numbered) fields. To obtain a video signal of the noninterlace type, the output signals of the first and image pickup devices CCD1 and CCD2 are alternately selected every scanning line and outputted to the succeeding stage. In this case, the frequency of the drive pulse signal for the devices CCD1 and CCD2 is set to be two times that of the drive pulse signal in the interlace mode.

FIG. 6 is a block diagram showing a signal converting/processing unit 400 of the color image pickup device of FIGS. 5A to 5C. The unit 400 separates the color signals derived from the image pickup devices CCD1 and CCD2 respectively containing the color filter arrays CFA1 and CFA2, and converts then into a video signal.

In the interlace mode, a vertical pulse signal Vp is applied to the switch portion 401 through a control terminal 402. The switch portion 401 responds to the vertical pulse signal Vp to alternately select the output signals of the first and second image pickup devices CCD1 and CCD2 every field, and outputs the selected signal to the succeeding stage, i.e., the succeeding stage of the unit. In a noninterlace mode, a horizontal pulse signal Hp, in place of the vertical pulse signal Vp, may be used. In response to the pulse signal, the switch portion 401 alternately selects the output signals of the first and second image pickup devices CCD1 and CCD2 every scanning line, and successively outputs the selected signal to the succeeding stage.

Figure 7A:
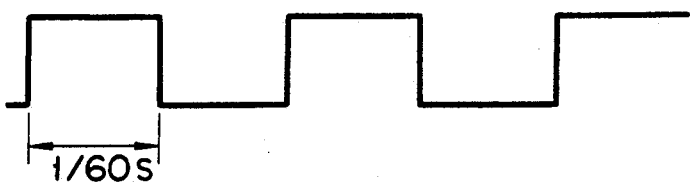
FIGS. 7A through 7D show a set of waveforms useful in explaining an operation of a switch portion of the signal converting/processing unit shown in FIG. 5 when it is operated in an interlace mode.
Figure 7B:
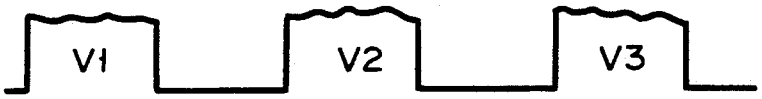
Figure 7C:
Figure 7D:
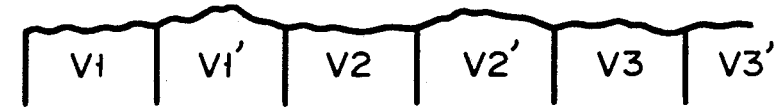

FIGS. 7A through 7D show a set of waveforms useful in explaining an operation of a switch portion of the signal converting/processing unit shown in FIGS. 5A to 5C when it is operated in an interlace mode. A vertical pulse signal Vp, which is inverted at periods of 1/60 sec., viz., for one field scanning period as shown in FIG. 7A, is applied to the terminal 402. Signal charges are read out of the first image pickup device CCD1 for each duration of the vertical pulse signal Vp when it is in a high level, that is, every odd numbered field. The signal charges read out are outputted as odd numbered field signals V1, V2, V3. See FIG. 7B. Signal charges are read out of the second image pickup device CCD2 for each duration of the vertical pulse signal Vp when it is in a low level, that is, every even numbered field. The signal charges read out are outputted as even numbered field signals V1', V2', V3'. See FIG. 7C. Accordingly, the odd numbered field signals V1, V2 and V3 and the even numbered field signals V1', V2' and V3' are alternately applied to the switch portion 401. Finally, the switch portion 401 under control of the vertical pulse signal Vp produces an interlace signal as a succession of field pulses V1, V1', V2, V2', V3 and V3', as shown in FIG. 7D.

Figure 8A:
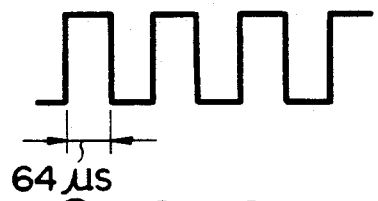
FIGS. 8A through 8D show a set of waveforms useful in explaining an operation of a switch portion of the signal converting/processing unit shown in FIG. 5 when it is used in a noninterlace mode.
Figure 8B:
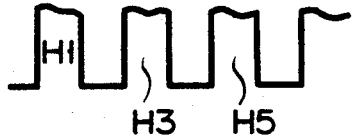
Figure 8C:
Figure 8D:
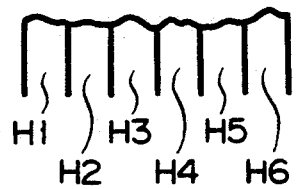

FIGS. 8A through 8D show a set of waveforms useful in explaining an operation of a switch portion of the signal converting/processing unit shown in FIGS. 5A to 5C when it is operated in a non interlace mode. A horizontal pulse signal Hp, which is inverted at periods of 64 us, viz., for one line scanning period as shown in FIG. 8A, is applied to the terminal 402. Signal charges are read out of the first image pickup device CCD1 for each duration of the horizontal pulse signal Hp when it is in a high level, that is, every odd numbered line. The signal charges read out are outputted as odd numbered line signals H1, H2, H3. See FIG. 8B. Signal charges are read out of the second image pickup device CCD2 for each duration of the horizontal pulse signal Hp when it is in a low level, that is, every even numbered line. The signal charges read out are outputted as even numbered line signals H1', H2', H3'. See FIG. 8C. Accordingly, the odd numbered line signals H1, H2 and H3 and the even numbered line signals H1', H2' and H3' are alternately applied to the switch portion 401. Finally, the switch portion 401 under control of the horizontal pulse signal Hp produces a noninterlace signal as a succession of line signals H1, H1', H2, H2', H3 and H3', as shown in FIG. 8D.

Figure 9A:
FIGS. 9A through 9G show a set of waveforms useful in explaining an operation of a color separation circuit of FIG. 6.
Figure 9B:
Figure 9C:
Figure 9D:
Figure 9E:
Figure 9F:
Figure 9G:

The interlace or the noninterlace signals thus selected and outputted from the switch portion 401 are applied to a color separation circuit 403 in the order of the horizontal linear array of pixels of the color filter array, viz., G, R, G, B, ..., as shown in FIG. 9A. The color separation circuit 403, in response to a gate pulse signal applied through a gate terminal 407, separates the input signal into indivisual color signals of colors R, G and B. Specifically, in response to a gate pulse signal for color G (FIG. 9B), it produces a G signal as shown in FIG. 9C. In response to a gate pulse signal for color R (FIG. 9D), it produces a R signal as shown in FIG. 9E. Similarly, in response to a gate pulse signal for color B (FIG. 9F), it produces a B signal as shown in FIG. 9G. Further, the color separation circuit 403 extracts a high frequency component YH of a luminance signal from the separated R, G, and B signals. These signals thus obtained are applied to a matrix circuit 404. The circuit 404 generates a luminance signal Y from those color signals of R, G and B. Further, it forms color difference signals (R-Y) and (B-Y) by using the luminance signal Y. These color difference signals (R-Y) and (B-Y), together with the high frequency component signal YH, are transferred to a color encoder 405 where it becomes a color video signal of the interlace or noninterlace type. The color video signal is led to an output terminal 406. In this way, a color video signal of a high quality is outputted from the terminal 406.

Many types of the color filter arrays are available for the instant embodiment, and contain the linear array of R, G and B, complementary color filter array, frequency interleave array, and color-difference order array, and the like.

Figure 10A:
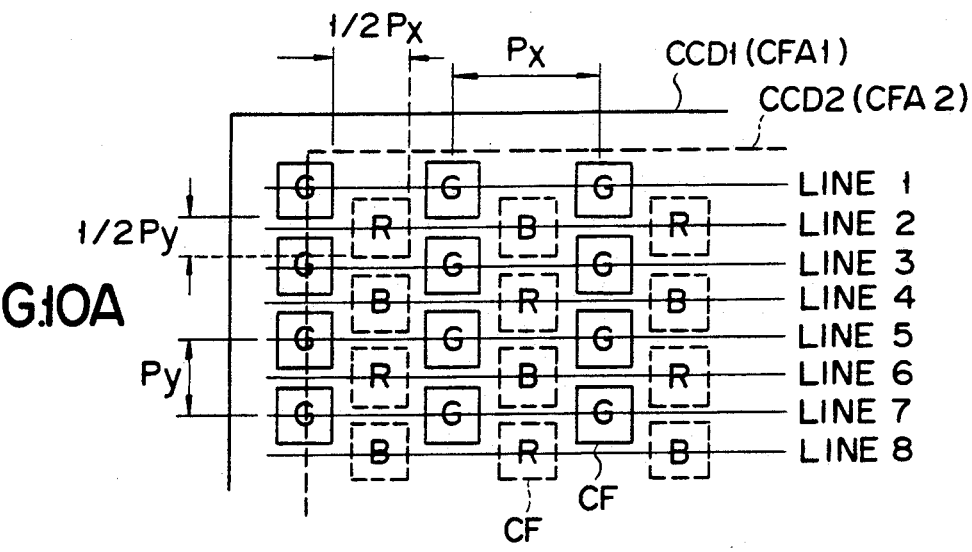
FIGS. 10A through 10C show plan views of an image pickup section of the image pickup device of FIG. 2 when the device is for picking up a color image, the illustration showing additional color filter arrays applied to the first and second pixel arrays, which make up the image pickup device, and showing a relationship between the first and second pixel arrays.
Figure 10B:
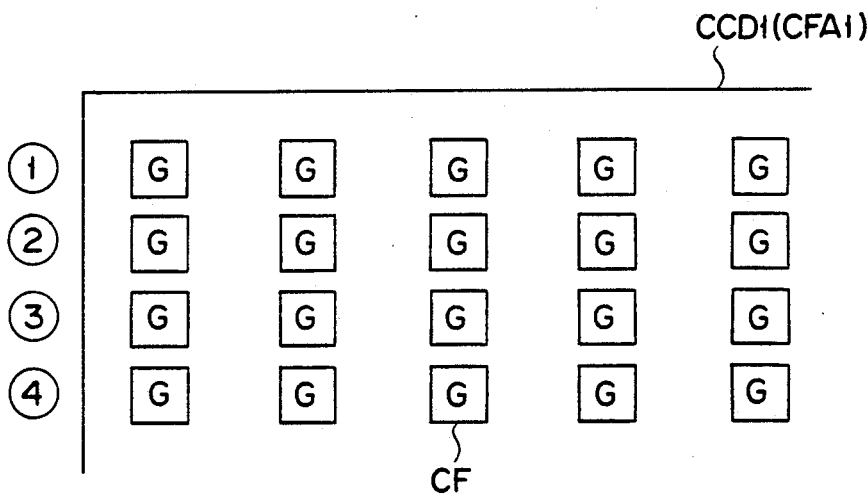
Figure 10C:
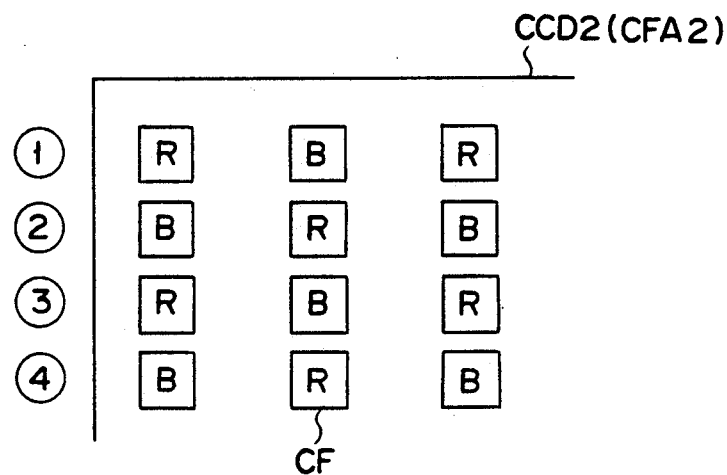

FIGS. 10A through 10C show plan views of another image pickup section of the image pickup device of FIG. 2 when the device is for picking up a color image. FIG. 10A shows an array of color filters CF applied to the pixels P when the first and second solid state image pickup devices CCD1 and CCD2 are combined. FIG. 10B shows a color filter array CFA1 of the first image pickup device CCD1. FIG. 10C shows a color filter array CFA2 of the second image pickup device CCD2. These color filter arrays CFA1 and CFA2 of the devices CCD1 and CCD2 form the color filter array shown in FIG. 10A. As shown, the color filter array CFA1 consists of a matrix array of only G color filters. The color filter array CFA1 consists of a matrix array in which color filters CF of R and B are linearly and repeatedly arrayed in both row and column directions, as shown. When the filter arrays CFA1 and CFA2 are combined, each color filter CF in the filter array CFA1 is displaced from the corresponding one in the filter array CFA2 vertically by ½Py and horizontally by ½Px, as shown in FIG. 10A. Further, the column linear array of the G filters and the column linear arrays of the R and B filters are alternately arranged as shown in FIG. 10A. It is noted that the color filters of G greatly affecting the rosolution is closely disposed, while the color filters of R and B are uniformly and relatively coarsely disposed. This feature provides an image of good color balance.

Each of the first and second image pickup devices CCD1 and CCD2 respectively having the color filter arrays CFA1 and CFA2 have 500 pixels in the vertical direction of the array. The image signals are successively read out of the devices CCD1 and CCD2 in the order of the scanning lines 1 to 8, viz., in a noninterlace manner. In this instance, the G signal is read out in the first scanning line 1, and R and B signals are read out in the second scanning line 2. Subsequently, the G signals are read out in the odd numbered scanning lines, and the R-B ordered signals are read out in the even numbered scanning lines. A total of 1000 pixel signals can be finally obtained. Accordingly, an image based on such signals is highly definite.

Further in the read mode, gain control amplifiers (not shown), that are provided in the respective signal paths, are controlled so that the amplitude of the color signals of G is equal to that of the R-B ordered color signal in an achromatic mode. Thus, the luminance signal can be gathered throughout all of the scanning lines of 1000. The color signals of G, and R and B are gathered in line successive order. It is noted that the satisfactory amount of luminance data ensures the improvement of the resolution of a reproduced image.

The filters of R and B are alternately arranged in the color filter array of the second image pick device CCD2, but those of R and B may be arranged in a stripe fashion. In this case, even if the filters are vertically zig-zagged during the manufacturing process of the filters, the resultant image is free from color mixing. This approach advantageously provides a high precession and easy manufacturing.

A dichroic prism may be used in place of the half prism in the split optical system 200, to separate a color light of a specific wave length (here green G) from other color lights. In this instance, light passed through the objective 100 is applied to the dichroic prism. The prism splits the received light into light rays of G and a light rays of R and B. The light of G is led to the first image pickup device CCD1, and the lights of R and B are led to the second image pickup device CCD2. Use of the dichroic prism doubles the efficacy of the light, as compared with that when the half prism is used. Consequently, it improves the sensitivity of the camera. The color filters R and B of the filter array of the second image pickup device CCD2 may be replaced by yellow (Ye) and cyan (Cy). As shown, a transmittance of the yellow Ye is higher than that of the red R, as shown in FIG. 11A. A transmittance of the cyan Cy is higher than that of the blue B, as shown in FIG. 11B. Accordingly, those colors absorb a less amount of light. This implies an improved efficiency of using the light and the sensitivity of the camera. Additionally, since the color filter array CFA1 of the first image pickup device CCD1 receives only the light of G, there is no need for the G filters and if necessary, used of complementary color filters suffices.

FIG. 12 is a block diagram showing a signal converting/processing unit 500 of the color image pickup device CCD1 and CCD2 using the color filter array CFA1 and CFA2 shown in FIGS. 10A to 10C. A G signal derived from the first device CCD1 is directly applied to a matrix circuit 502. R and B signals from the second device CCD2 are applied to a color separation circuit 501 where those are separated into R and B signals. These separated color signals are applied to the matrix circuit 502. The subsequence processings are the same as those in the case of FIG. 6. The matrix 502 generates color difference signals (R-Y) and (B-Y), and a high-frequency component luminance signal YH. A color encoder exercises a given encoding to generate a color video signal and applies it to an output terminal 504. In this way, a high quality color video signal is derived from the output terminal 504.

Figure 13:
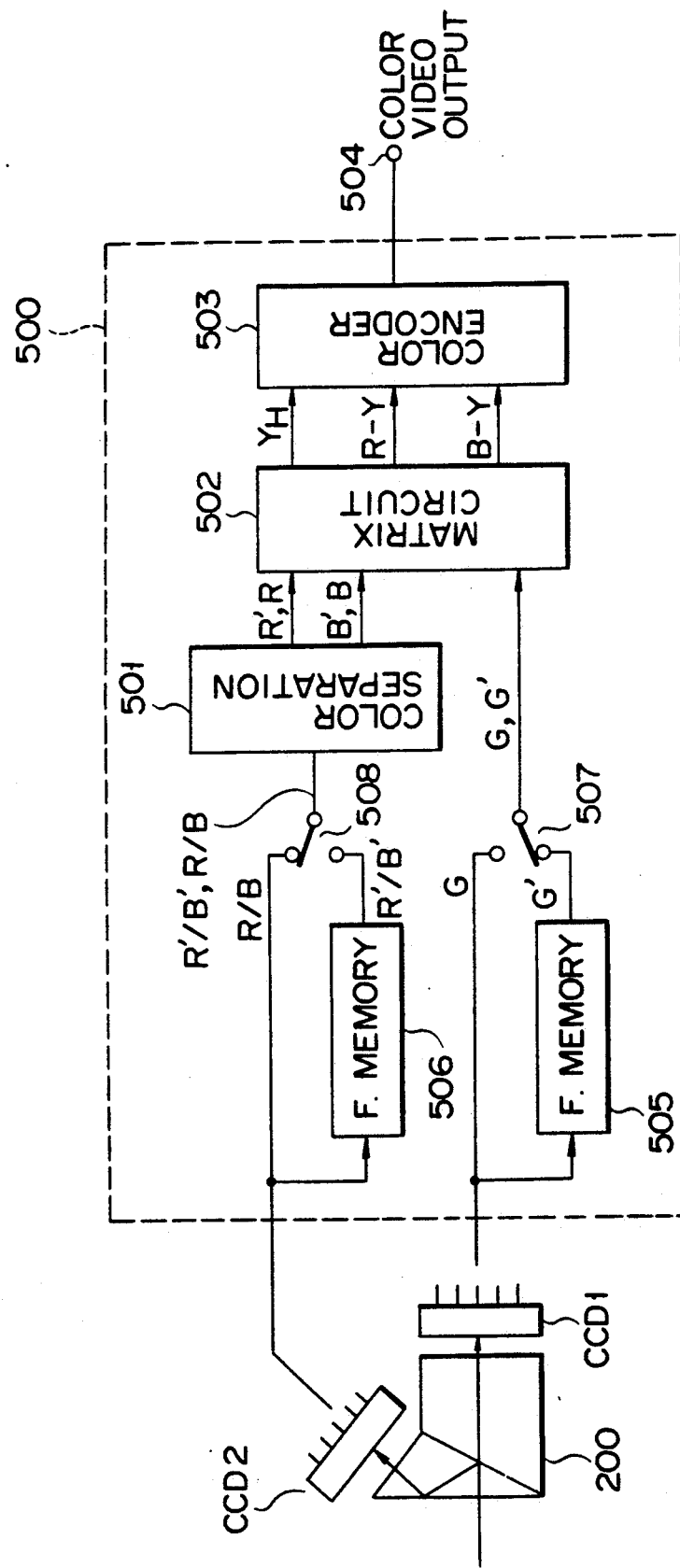
FIG. 13 is a block diagram showing another signal converting/processing unit of the color image pickup device using the color filter array shown in FIG. 10.

This instance is applicable only for the noninterlace system in which the image signals are alternately selected every scanning line and outputted. See FIGS. 8A through 8D. The reason for this is that if the above approach is applied to the interlace operation, only the G color is displayed in the odd numbered fields and only the R and B colors, in the even numbered fields. FIG. 13 shows another arrangement of the signal converting/processing unit 500. The unit 500 of FIG. 13 is operable in the interlace mode. Like reference numerals are used for designating like portions in FIG. 12, for simplicity.

A G signal derived from the device CCD1 is applied to a first input terminal of a first switch portion 507. The same is delayed by one field by means of a first field memory 505, and then is applied to a second input terminal of the first switch portion 507. An R/B signal derived from the device CCD2 is applied to a first input terminal of a second switch portion 508. The same is delayed by one field by means of a second field memory 506, and then is applied to a second input terminal of the second switch portion 508. The first switch portion 507 selects the signals from the device CCD1 in the odd numbered fields, and the delayed signal G' signal from the memory 505 in the even numbered fields. These signals G and G' derived from the first switch portion 502 are applied to the matrix circuit 502. The second switch portion 508 selects the delayed R'/B' signal from the second field memory 506 in the odd numbered fields, and the signal R/B signal from the device CCD2 in the even numbered fields. These signals R'/B' and R/B signals from the switch 508 are successively separated into R', R, B' and B by the color separation circuit 501, and then applied to the matrix circuit 502.

Figure 14A:
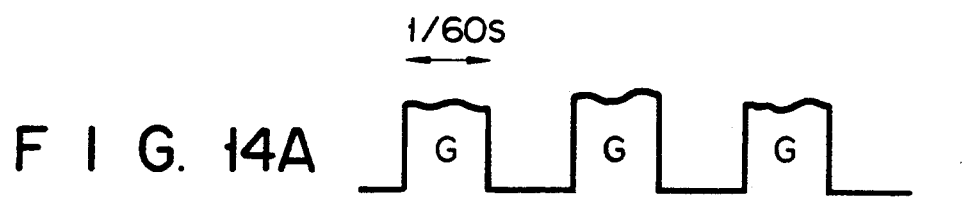
FIGS. 14A through 14D show a set of waveforms useful in explaining an operation of the signal converting/processing unit shown in FIG. 13 when it is operated in an interlace mode.
Figure 14B:
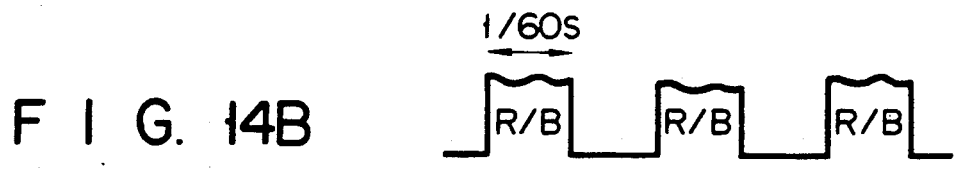
Figure 14C:
Figure 14D:

Thus, the first and second image pickup devices CCD1 and CCD2 produces G and R/B signals, as shown in FIGS. 14A and 14B. These signals are delayed by one field to generate G' and R'/B' signals. The first and second switch portions 507 and 508 alternately select and output the signals G and G', R/B and R'/B', thereby to obtain continuous signals as shown in FIGS. 14C and 14D. In this way, in the odd numbered fields, a color video signal based on the G and R'/B' signals are obtained, and in the even numbered fields, a color video signal based on the G' and R/B signals are obtained. In this circuit arrangement, if the switches 507 and 508 are respectively connected to the upper contacts, the FIG. 12 circuit arrangement is formed. Under this condition, the FIG. 13 circuit is operable in the noninterlace mode.

What is claimed is:

1. A video camera apparatus using a plurality of imaging devices, said apparatus comprising:
    a split optical system for receiving light through an objective and directing said light into first and second optical paths in different directions;
    a first solid state image pickup device for receiving light traveling through said first optical path, said first solid state image pickup device having a first plurality of optoelectric transducing elements as pixels arranged vertically and horizontally in an array in a plane on which an image is formed by said light passing through said objective, said first solid state image pickup device successively receiving first charges generated in said first plurality of optoelectric transducing elements and outputting said first charges as image signals, said first solid state image pickup device including a first color filter array made up of color filters as the first solid state image pickup device comprising color filters disposed facing said first plurality of optoelectric transducing elements so that a complete color image can be reproduced;

a second solid state image pickup device for receiving light traveling through said second optical path, said second solid state image pickup device having a second plurality of optoelectric transducing elements as pixels arranged vertically and horizontally in an array in a plane on which an image is formed by said light passing through said objective, a space between each of said optoelectric transducing elements being equal to a space between two adjacent optoelectric transducing elements arranged in said plane of said first solid state image pickup device, said optoelectric transducing elements arranged in said plane of said second solid state image pickup device being at least vertically displaced by ½ of a pixel pitch from said corresponding optoelectric transducing elements arranged in said plane of said first solid state image pickup devices, respectively, said second solid state image pickup device successively receiving second charges generated in said optoelectric transducing elements, and outputting said second charges as image signals, said second solid state image pickup device including a second color filter array having the same arrangement as that of the first solid-state image pickup device comprising color filters disposed respectively facing said second plurality of optoelectric transducing elements so that a color image can be reproduced by using the first and second solid-state image pickup devices independently of each other; and signal converting/processing means for converting image signals derived from at least one of said first and second solid state image pickup devices into video signals.

2. A video apparatus as in claim 1, wherein said signal converting/processing means comprises an input select means for alternately selecting each field of said image signals derived from said first and second solid state image pickup device and alternately outputting each field of said image signals to an encoder disposed within said converting/processing means, said encoder converting said image signals into a video signal indicative of an interlace system.

3. A video camera apparatus as in claim 1, wherein said signal converting/processing means includes an input select means for selecting said image signal derived from at least one of said first solid state image pickup device and said second solid state image pickup device and continuously outputting said image signal to an encoder disposed within said converting/processing means, said encoder converting said image signal into a video signal.

4. A video camera apparatus as in claim 1, wherein said signal converting/processing means comprises adder means for adding said image signals derived from said first and second solid state image pickup device and providing an added signal, said signal converting/processing means converting said added signal into a video signal.

5. A video camera apparatus using a plurality of imaging devices, said apparatus comprising:

a split optical system for receiving light through an objective and directing said light into first and second optical paths in different directions;

a first solid state image pickup device for receiving light traveling through said first optical path, said first solid state image pickup device having a first plurality of optoelectric transducing elements as pixels arranged vertically and horizontally in an array in a plane on which an image is formed by said light passing through said objective, said first solid state image pickup device successively receiving first charges generated in said first plurality of optoelectric transducing elements and outputting said first charges as image signals, said first solid state image pickup device including a first color filter array made up of color filters as the first solid state image pickup device comprising color filters disposed facing said first plurality of optoelectric transducing elements so that a complete color image can be reproduced;

a second solid state image pickup device for receiving light traveling through said second optical path, said second solid state image pickup device having a second plurality of optoelectric transducing elements as pixels arranged vertically and horizontally in an array in a plane on which an image is formed by said light passing through said objective, a space between each of said optoelectric transducing elements being equal to a space between two adjacent optoelectric transducing elements arranged in said plane of said first solid state image pickup device, said optoelectric transducing elements arranged in said plane of said second solid state image pickup device being at least vertically displaced by ½ of a pixel pitch from said corresponding optoelectric transducing elements arranged in said plane of said first solid state image pickup devices, respectively, said second solid state image pickup device successively receiving second charges generated in said optoelectric transducing elements, and outputting said second charges as image signals, said second solid state image pickup device including a second color filter array with the same arrangement as the first solid-state image pickup device comprising color filters disposed respectively facing said second plurality of optoelectric transducing elements so that a color image can be reproduced by using the first and second solid-state image pickup devices independently of each other; and input select means for alternately selecting each scanning line of said image signals derived from said first and second solid state image pickup device and alternately outputting each scanning line to an encoder disposed within said converting/processing means, said encoder converting said image signals into a video signal indicative of a noninterlace system.

6. A video camera apparatus using a plurality of imaging devices, said apparatus comprising:

a split optical system for receiving light through an objective and directing said light into first and second optical paths in different directions;

a first solid state image pickup device for receiving light traveling through said first path, said first solid state image pickup device having a first plurality of optoelectric transducing elements as pixels arranged vertically and horizontally in an array in a plane on which an image is formed by said light passing through said objective, said first solid state image pickup device successively receiving first charges generated in said first plurality of optoelectric transducing elements and outputting said first charges as image signals, said first solid state image pickup device including a first color filter array made up of color filters as the first solid state image pickup device comprising color filters disposed facing said first plurality of optoelectric transducing elements so that a complete color image can be reproduced;

a second solid state image pickup device for receiving light traveling through said second optical path, said second solid state image pickup device having a second plurality of optoelectric transducing elements as pixels arranged vertically and horizontally in an array in a plane on which an image is formed by said light passing through said objective, a space between each of said optoelectric transducing elements being equal to a space between two adjacent optoelectric transducing elements arranged in said plane of said first solid state image pickup device, said optoelectric transducing elements arranged in said plane of said second solid state image pickup device being at least vertically displaced by ½ of a pixel pitch from said corresponding optoelectric transducing elements arranged in said plane of said first solid state image pickup devices, respectively, said second solid state image pickup device successively receiving second charges generated in said optoelectric transducing elements, and outputting said second charges as image signals, said second solid state image pickup device including a second color filter array with the same arrangement as the first solid-state image pickup device comprising color filters disposed respectively facing said second plurality of optoelectric transducing elements so that a color image can be reproduced by using the first and second solid-state image pickup devices independently of each other;

a first input select means for alternately selecting said image signals derived from said first and second solid state image pickup devices, providing an output indicative of each field of said image signals when operating in an interlace mode and providing an output indicative of each scanning line of said image signals when operating in a noninterlace mode;

adder means for adding said signals derived from said first and second solid state image pickup devices and providing an added signal;

a second input select means for selecting and outputting said output of said first input select means when an amount of said light passing through said objective is equal to or greater than a predetermined lower limit value of said first and second solid state image pickup devices, and selecting and outputting said added signal provided by said adder means when an amount of said light passing through said objective is less than said lower limit value; and encoder means for converting an output of said second input select means into a video signal.

* * * * *